United States Patent [19]

Ishibashi et al.

[11] 4,080,216

[45] Mar. 21, 1978

[54] OPTICAL GLASS

[75] Inventors: Kazufumi Ishibashi, Sagamihara; Takeo Ichimura, Tokyo, both of Japan

[73] Assignee: Nippon Kogaku K.K., Tokyo, Japan

[21] Appl. No.: 701,641

[22] Filed: Jul. 1, 1976

[30] Foreign Application Priority Data

Jul. 7, 1975 Japan ................................ 50-82787

[51] Int. Cl.$^2$ ........................... C03C 3/14; C03C 3/30
[52] U.S. Cl. .................................... 106/54; 156/47 Q
[58] Field of Search ............................ 106/47 Q, 54

[56] References Cited

U.S. PATENT DOCUMENTS

| 2,899,322 | 8/1959 | Bromer et al. | 106/47 Q |
| 3,081,178 | 3/1963 | Weissenberg et al. | 106/47 Q |
| 3,082,101 | 3/1963 | Geffcken et al. | 106/47 Q |
| 3,672,920 | 6/1972 | Ishiguri | 106/47 Q |

Primary Examiner—Winston A. Douglas
Assistant Examiner—Mark Bell
Attorney, Agent, or Firm—Shapiro and Shapiro

[57] ABSTRACT

An optical glass having a refractive index (nd) in the range of 1.71 to 1.74 and Abbe number (v) in the range of from 49 to 54, the glass consisting essentially of, by weight, 1 to 5% $SiO_2$, 30 to 41% $B_2O_3$, 2 to 6% $Al_2O_3$, 42 to 50% $La_2O_3$, 3 to 7% $ZrO_2$, and 1 to 12% $Ta_2O_5$.

3 Claims, No Drawings

OPTICAL GLASS

BACKGROUND OF THE INVENTION

1. Field of the Invention

This invention relates to optical glass and, more particularly, the invention is directed to a composition of optical glass having refractive index (nd) of from 1.71 to 1.74 and Abbe number (v) of from 49 to 54 as the optical constants thereof.

2. Description of the Prior Art

For optical glass having a refractive index of from 1.71 to 1.74 and Abbe number of from 49 to 54, there is known a glass which consists principally of $B_2O_3$ as the network forming oxide of the glass, $La_2O_3$ as the network modifying oxide which imparts to the glass the optical characteristics of a high refractive index and low optical dispersion, and a divalent metal oxide (RO), for example, CaO, SrO, BaO, ZnO, CdO or PbO as another network modifying oxide having the function of a flux. (An optical glass, when its melting temperature is higher, has some disadvantages of devitrification and of worse workability. The flux serves, when mixing the glass, to prevent the melting temperature of glass from being higher as leading to the above disadvantages. Different ingredients to be mixed need different fluxes.) A glass composition of this type is disclosed in U.S. Pat. No. 3,081,178. The optical glass of this composition, however, is limited in its chemical durability, because it does not contain a sufficient quantity of a divalent metal oxide (RO) so as to be stable within its optical constants.

In an attempt to overcome the above-described shortcoming, it has been proposed to provide an optical glass having the above-mentioned optical constants and which is made without the divalent metal oxide (RO). In U.S. Pat. No. 3,174,871 a composition is disclosed which consists of, by weight, 6 to 36% of $B_2O_3$, 7 to 37% of $SiO_2$, 50 to 67% of $La_2O_3$, and 7 to 21% of $Al_2O_3$. The optical glass of this composition, however, contains a remarkably large quantity of $La_2O_3$, as high as 50% and higher, and as a result, the temperature required for its melting is extremely high; also, it has a tendency to devitrify. In view of these limitations, this type of optical glass is not commercially practical.

SUMMARY OF THE INVENTION

It is a primary object of the present invention to provide a composition for optical glass which is stable within its optical constant, in which no divalent metal oxide is present as a flux to furnish excellent chemical durability, and wherein the temperature required for melting the composition is not unduly high because of the $La_2O_3$ content below 50% by weight, so that any one of the ingredients of the glass composition needs no double function including the flux function, thus minimizing devitrification.

According to the invention generally, there is provided an optical glass consisting essentially of, by weight, 1 to 5% $SiO_2$, 30 to 41% $B_2O_3$, 2 to 6% $Al_2O_3$, 42 to 50% $La_2O_3$, 3 to 7% $ZrO_2$, and 1 to 12% $Ta_2O_5$. (first compositional range)

More specifically, the optical glass has a composition consisting essentially of, by weight, 2 to 4% $SiO_2$, 31 to 35% $B_2O_3$, 3 to 5% $Al_2O_3$, 45 to 49% $La_2O_3$, 4 to 6% $ZrO_2$, and 7 to 11% $Ta_2O_5$. (second compositional range)

The foregoing object, other objects, as well as the reasons for the compositional ranges of the optical glasses made according to the invention will become apparent from the following detailed description thereof.

DESCRIPTION OF THE PREFERRED EMBODIMENT

Optical glass made according to the invention does not contain a divalent metal oxide (RO) as the flux, thereby furnishing superior chemical durability. Also, it does not contain $La_2O_3$ in an amount exceeding 50%, by weight, and as a result, extremely high temperature is not required for its melting, and the glass does not tend to devitrify.

$SiO_2$ is the network forming oxide. This ingredient also acts to minimize the tendency of the glass to devitrify. With a $SiO_2$ content, by weight, below 1%, the preventive effect of devitrification is small, while, with a $SiO_2$ content of above 5%, the liquifaction temperature becomes unduly high making it difficult to obtain a homogeneous melting.

$B_2O_3$ is also a network forming oxide. With a $B_2O_3$ content, by weight, of below 30%, vitrification of the compound is difficult. When the $B_2O_3$ content exceeds 41%, the refractive index of the resultant glass is undesirably lowered.

$Al_2O_3$ has only a function of preventing the glass from devitrifying. With the $Al_2O_3$ content below 2%, the preventive effect of devitrification is small, and with a content above 6%, devitrification takes place.

$La_2O_3$ is the network modifying oxide. With a content thereof below 42%, by weight, the desired refractive index is not obtained. When the amount of this ingredient exceeds 50% of the composition, there is a tendency to cause devitrification.

Below 3%, by weight, of $ZrO_2$ is liable to cause devitrification, and such small amount is not sufficient to improve the chemical durability of the resultant glass. With a content above 7%, there is the tendency to cause devitrification.

When the amount of $Ta_2O_5$ is below 1%, by weight, of the composition, the desired refractive index is not obtained, and when its content exceeds 12% there is the tendency to cause devitrification.

Optical glass having the aforementioned second compositional range (i.e., by weight, 2–4% $SiO_2$, 31–35% $B_2O_3$, 3–5% $Al_2O_3$, 45–49% $La_2O_3$, 4–6% $ZrO_2$, and 7–11% $Ta_2O_5$) is preferred because it is most stable with regard to its ability to withstand devitrification, furnish chemical durability, and suitability for industrial mass-production, while furnishing the desired optical constants.

The following table indicates preferred examples of various compositional ratios (% by weight) of each of the constituent ingredients in optical glasses made according to the present invention, the optical constants also being indicated.

| Composition (wt. %) & Optical Constant | Example No. | | | | | | | |
|---|---|---|---|---|---|---|---|---|
| | 1 | 2 | 3 | 4 | 5 | 6 | 7 | 8 |
| $SiO_2$ | 1.3 | 2.2 | 3.2 | 2.7 | 3.1 | 2.2 | 1.6 | 2.2 |
| $B_2O_3$ | 35.1 | 32.5 | 30.3 | 33.9 | 32.3 | 33.1 | 40.4 | 33.0 |
| $Al_2O_3$ | 3.9 | 3.7 | 5.8 | 2.3 | 3.8 | 3.8 | 2.8 | 3.8 |
| $La_2O_3$ | 44.9 | 47.5 | 42.2 | 46.8 | 47.5 | 49.1 | 49.9 | 47.2 |
| $ZrO_2$ | 3.2 | 4.5 | 6.6 | 4.5 | 5.1 | 5.8 | 4.2 | 4.8 |
| $Ta_2O_5$ | 11.6 | 9.6 | 11.9 | 9.8 | 8.2 | 6.0 | 1.1 | 9.0 |
| nd | 1.7318 | 1.7464 | 1.7387 | 1.7427 | 1.7404 | 1.7273 | 1.7116 | 1.7418 |
| v | 49.8 | 49.6 | 49.1 | 49.1 | 49.4 | 51.4 | 53.5 | 49.3 |

Of the above-enumerated examples, the glass of Example No. 8 composition has been found to be very stable against devitrification. This composition consists essentially of the following ingredients in approximate amounts, by weight: 2% $SiO_2$, 33% $B_2O_3$, 4% $Al_2O_3$, 47% $La_2O_3$, 5% $ZrO_2$ and 9% $Ta_2O_5$.

The optical glass according to the present invention can be manufactured by first weighing raw material for each composition, then sufficiently mixing the raw material compositions in a mixing device, melting the raw material mix in a platinum crucible at a temperature of from 1,250° to 1,300° C, and after refining and agitation, casting the molten glass into a metal mold, and gradually cooling the same to solidify.

In the two embodiments of the present invention, $Al_2O_3$ has a possibility of a double function including the flux function, but the $Al_2O_3$ does not serve as a flux in the glass composition of the invention. This is because the melting temperature of the ingredients except the $Al_2O_3$ reaches no temperature resulting in the previous disadvantages. Therefore, the present invention necessitates no additional flux as well as has no ingredient serving as a flux.

Thus, it is possible, according to the present invention, to manufacture on an industrialized scale optical glass having the optical constants in the range of 1.71 to 1.74 for the refractive index (nd), and 49 to 54 for the Abbe number (v), the glass having excellent chemical durability, and lending itself to ease in production.

Although the present invention has been described with reference to preferred embodiments thereof, it should be understood that the invention is not limited to these examples only. Various changes and modifications may be made without departing from the spirit and scope of the invention as set forth in the appended claims.

We claim:

1. An optical glass composition devoid of a divalent metal oxide having a refractive index of from 1.71 to 1.74 and Abbe number of from 49 to 54 which consists essentially of, by weight:

$SiO_2$ . . . . . 1 to 5%,
$B_2O_3$ . . . . . 30 to 41%,
$Al_2O_3$ . . . . . 2 to 6%,
$La_2O_3$ . . . . . 42 to 50%,
$ZrO_2$ . . . . . 3 to 7% and
$Ta_2O_5$ . . . . . 1 to 12%.

2. An optical glass composition as set forth in claim 1, wherein the ingredients are present in the following amounts, by weight:

$SiO_2$ . . . . . 2 to 4,
$B_2O_3$ . . . . . 31 to 35,
$Al_2O_3$ . . . . . 3 to 5,
$La_2O_3$ . . . . . 45 to 49,
$ZrO_2$ . . . . . 4 to 6 and
$Ta_2O_5$ . . . . . 7 to 11.

3. An optical glass composition as set forth in claim 2, wherein the ingredients are present in the following approximate amounts, by weight:

$SiO_2$ . . . . . 2,
$B_2O_3$ . . . . . 33,
$Al_2O_3$ . . . . . 4,
$La_2O_3$ . . . . . 47,
$ZrO_2$ . . . . . 5 and
$Ta_2O_5$ . . . . . 9.

* * * * *